3,402,183
NEOPENTYL-BIS-ESTER OF 3,4-DIHYDRO-2H-
PYRAN CARBOXYLIC ACID
Arthur Ibbotson, Manchester, England, assignor to Imperial Chemical Industries Limited, London, England, a corporation of Great Britain
No Drawing. Filed June 28, 1965, Ser. No. 467,696
Claims priority, application Great Britain, July 17, 1964, 29,277/64
1 Claim. (Cl. 260—345.8)

ABSTRACT OF THE DISCLOSURE

The neopentyl-bis-ester of 3,4-dihydro-2H-pyran-2-carboxylic acid, said ester having the formula:

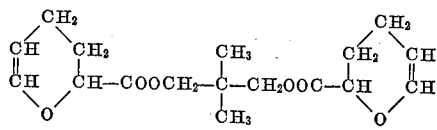

The ester may be prepared by any of the normal processes used for the manufacture of esters.

The ester is preferably manufactured by an ester interchange reaction involving the reaction of neopentyl glycol with an ester of 3,4-dihydro-2H-pyran-2-carboxylic acid; the reaction is formulated as follows:

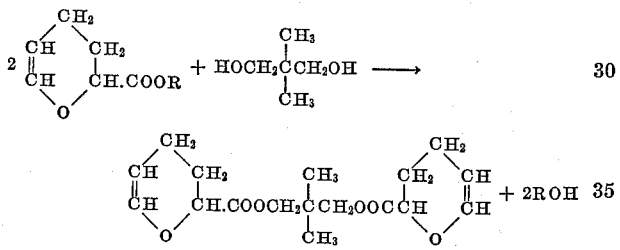

where R is for example a lower alkyl group or the 3,4-dihydro-2H-pyran-2-methyl radical.

When R is the 3,4-dihydro-2H-pyran-2-methyl radical, that is when acrolein tetramer is used as the starting material, the useful 2-hydroxymethyl-3,4-dihydro-2H-pyran is obtained as a by-product (ROH).

The neopentyl bis-ester of 3,4-dihydro-2H-pyran-2-carboxylic acid is useful as a polymer forming intermediate in the manufacture of foamed polymers.

Disclosure

This invention relates to a novel bis-ester of 3,4-dihydro-2H-pyran-2-carboxylic acid, to the manufacture of that ester and to the use of that ester in the manufacture of polymeric materials.

Thus according to the present invention there is provided the neopentyl-bis-ester of 3,4-dihydro-2H-pyran-2-carboxylic acid, said ester having the formula:

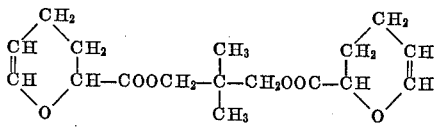

The ester of the present invention may be prepared by any of the normal processes used for the manufacture of esters.

The ester of the present invention is preferably manufactured by an ester interchange reaction involving the reaction of neopentyl glycol with an ester of 3,4-dihydro-2H-pyran-2-carboxylic acid; the reaction is formulated as follows:

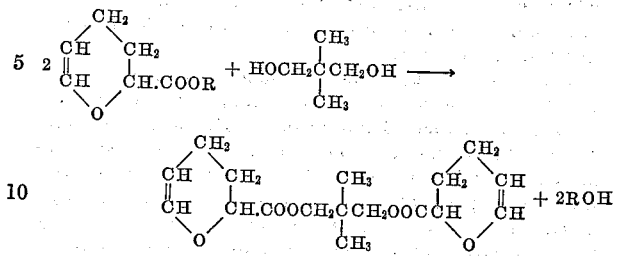

where R is for example, a lower alkyl group or the 3,4-dihydro-2H-pyran-2-methyl radical.

When R is the 3,4-dihydro-2H-pyran-2-methyl radical, that is when acrolein tetramer is used as the starting material, the useful 2-hydroxymethyl-3,4-dihydro-2H-pyran is obtained as a by-product (ROH).

Thus as a further feature of the present invention there is provided a process for the manufacture of the neopentyl bis-ester of 3,4-dihydro-2H-pyran-2-carboxylic acid which comprises carrying out an ester interchange reaction between neopentyl glycol and an ester of 3,4-dihydro-2H-pyran-2-carboxylic acid in the presence of an ester-interchange catalyst.

Preferred esters for use as starting materials are the lower alkyl esters where the alkyl group contains from 1 to 4 carbon atoms or the 3,4-dihydro-2H-pyran-2-methyl ester of the carboxylic acid.

Suitable ester interchange catalysts include sodium, sodium methoxide, the sodium alcoholate of 2-hydroxymethyl-3,4-dihydro-2H-pyran, disodium hexaalkoxy titanates and lead oxide. The preferred catalyst is the sodium salt of the alcohol ROH.

The process is carried out by heating the starting ester and neopentyl glycol together in the presence of the ester interchange catalyst and allowing the lower boiling alcohol to distil over, the pressure being reduced if necessary to assist in distillation of the low boiling alcohol as it is formed.

The ester of the present invention, the neopentyl bis-ester of 3,4-dihydro-2H-pyran-2-carboxylic acid is useful as a polymer forming intermediate in the manufacture of foamed polymers.

It has already been proposed to manufacture cellular polymeric materials by polymerising a compound containing two or more dihydro pyran nuclei with a polymerisation catalyst in the presence of a foaming agent. It has also been proposed to carry out this manufacture in the presence of a compound or compounds reactive with or polymerisable with the compound containing the dihydro pyran nuclei.

It has now been found that the bis-ester of the present invention is a valuable starting material for the manufacture of cellular polymeric materials and gives cellular materials of low friability and enhanced hydrolytic stability compared with the analogous derivatives of aliphatic glycols such as ethylene glycol and 1,4-butylene glycol.

Thus as a further feature of the present invention there is provided a process for the manufacture of cellular polymeric materials which comprises mixing the neopentyl bis-ester of 3,4-dihydro-2H-pyran-2-carboxylic acid with a foaming agent and a catalyst and optionally a compound reactive or copolymerisable with said ester and allowing the mixture to foam.

Acidic catalysts are preferred.

Examples of acidic catalysts that may be used include the prototropic acids perchloric acid, (aqueous) fluoroboric acid, HFeCl₄, and hydrogen iodide, and Lewis acid catalysts such as boron trifluoride, generally used in the form of its complex with an oxygen-containing compound, ferric chloride, stannic chloride, phosphorus pentafluoride and antimony pentafluoride.

Examples of suitable non-acidic catalysts include iodine and iodine containing compounds such as iodine chloride, iodine bromide, iodine perchlorate, iodine acetate, iodine triphosphate and iodine triacetate; triphenyl methyl derivatives of anions having a low ester forming tendency, for example triphenylmethyl perchlorate, hexachloroantimonate, chloromercurate, chlorzincate and chloroaluminate; alkyl, acyl and aroyl perchlorates and hexachloroantimonates such as the tert-butyl, acetyl and benzoyl compounds; and diazonium salts such as diazonium chloride, fluoroborates, perchlorates and hexachlorantimonates. Mixtures of suitable catalysts may be used.

Catalysts used in the present invention are conveniently employed as 5% to 50% solutions in solvents for example as solutions in the monoethylether of ethylene glycol, the monoethyl ether of diethylene glycol, nitromethane, nitrobenzene, butyrolactone, acetone, n-butanol or diethyl ether.

The amount of catalyst used may vary considerably, varying for example with the scale of foam formation, the efficiency of mixing and the efficiency of the catalyst or catalyst combination employed. In general the amount of catalyst used in the foaming process varies from 0.2% to 3%, preferably from 0.3% to 1.5% of the total weight of the foaming composition. Even smaller amounts of very efficient catalysts may be used.

Any foaming agent may be used in the foaming process particularly those which have been proposed for use in conjunction with polyurethane forming materials for the production of foamed cellular polyurethane materials. Volatile foaming agents are preferred.

Volatile foaming agents suitable for use in the foaming process of the invention are those which are soluble or dispersible in the other ingredients of the foaming composition and are sufficiently volatile that they vaporise during the formation of the foamed polymeric materials. The heat of the catalysed polymer forming reaction causes the foaming agent to boil, and the vapour forms bubbles which expand during the reaction to give a low density, foamed polymeric mass. Preferred foaming agents are the halogenated hydrocarbons such as trichloromonofluoromethane, dichlorotetrafluoroethane, trichlorotrifluoroethane, dibromodifluoromethane, dichlorohexafluorocyclobutane, methylene chloride, chloroform, trichloroethylene, carbon tetrachloride and perchloroethylene.

There may also be incorporated in the foaming process of the present invention other materials normally incorporated in the manufacture of polymeric materials such as for example flame retardants, surfactants, dyes, fillers, stabilisers, antioxidants, extenders, plasticisers and viscosity-modifiers such as polyvinyl chloride, vinyl acetate/vinyl chloride copolymers and rubbers.

Examples of compounds reactive with or copolymerisable with the said ester which may optionally be incorporated in the process of the present invention include those compounds whose reactivity towards the said ester is increased in the presence of the catalysts employed.

Compounds reactive or copolymerisable with the said polymerisable ester which have been found especially useful for incorporation in the compositions of the present invention include compounds containing two or more dihydropyran nuclei, phenolic compounds, aliphatic monohydric and polyhydric alcohols, epoxidised materials containing at least one epoxide group per molecule, acidic compounds containing at least two carboxylic acid groups per molecule, amido compounds containing at least two amido groups per molecule, carbamate compounds containing at least two carbamate groups per molecule and polymerisable alpha, beta-monoethylenically unsaturated compounds.

Examples of suitable compounds having two or more dihydropyran nuclei include 3,4-dihydro-2H-pyran-2-methyl-(3,4-dihydro-2H-pyran-2-carboxylate) also known as acrolein tetramer, 1,2-ethandioxybis(3',4'-dihydro-2'H-pyran-2'-carbonyl) of the formula

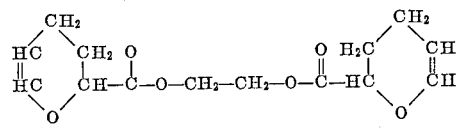

bis(3,4-dihydro-2H-pyran-2-methyl)succinate of the formula

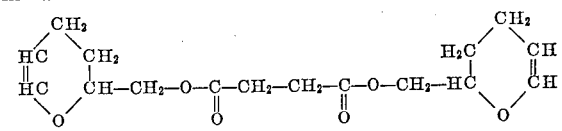

1,2 - bis(3',4' - dihydro - 2'H - pyran - 2' - oxy)ethane of the formula

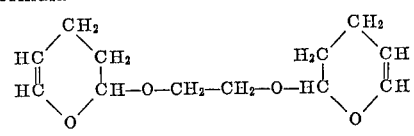

1,1 - bis(3',4' - dihydro - 2'H - pyran - 2' - methoxy) ethane of the formula

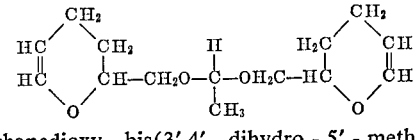

1,2 - ethanedioxy - bis(3',4' - dihydro - 5' - methyl - 2'H-pyran-2'-carbonyl) of the formula

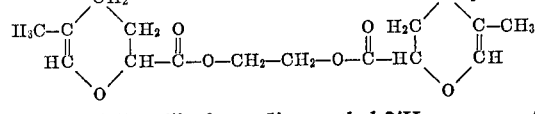

1,2 - bis(3',4' - dihydro - 5' - methyl-2'H - pyran - 2'-oxy)ethane of the formula

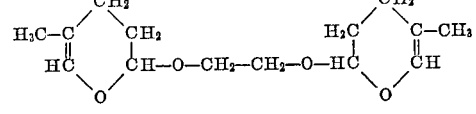

1,1 - bis(3',4' - dihydro - 5' - methyl - 2'H - pyran - 2'-methoxy)ethane of the formula

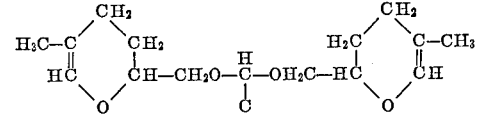

3,4 - dihydro - 2H - pyran - 2 - methyl(3,4 - dihydro - 5-methyl-2H-pyran-2,2-dimethyl)succinate of the formula

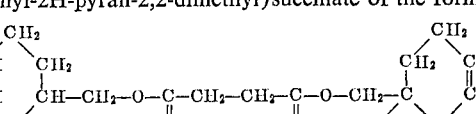

toluene - 2,4 - bis(3',4' - dihydro - 2'H - pyran - 2'-methyl)carbamate of the formula

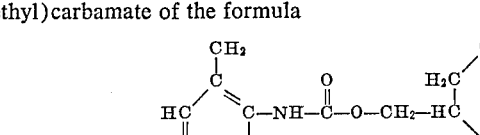
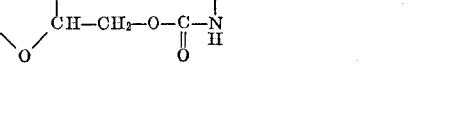

the tri-ester derived from three moles of 2-hydroxymethyl-3,4-dihydro-2H-pyran and one mole of orthophosphoric acid, and the esters derived from 2-hydroxymethyl-3,4-dihydro-2H-pyran and organic polybasic acids such as maleic and adipic acids.

Examples of suitable phenolic compounds are those aromatic compounds which contain one or more hydroxyl groups in their molecules such as phenol, alkyl-substituted phenols, for example, cresols, halogen-substituted phenols, for example, 2,4,5-trichlorophenol, resorcinol, phloroglucinol, catechol, hydroquinone, 2:2 - di - p - hydroxyphenylpropane, low molecular weight phenol-terminated polycarbonates, the condensation products of phenols with aldehydes and ketones, etc.

Examples of suitable monohydric or polyhydric alcohols include amyl alcohol, 2-ethylhexyl alcohol, nonyl alcohol, n-decyl alcohol, polypropylene glycol, castor oil, sugar alcohols, alkyl and acyl cellulose derivatives, polyether condensates of polyhydric alcohols and olefin oxides such as the polypropylene oxide condensates of hexahydroxy sugar alcohols, ethylene glycol, 1,5-pentandiol, glycerol, 1,2,6-hexanetriol and hydroxyl-containing esters and polyesters obtained by condensation of polyhydric alcohols and polybasic acids. The proportions of condensating ingredients in said hydroxyl-containing esters and polyesters may range from one mole of polyol for each carboxylic acid group in the acid to one mole of polycarboxylic acid for each hydroxyl group in the polyol.

Suitable polycarboxylic acid ingredients include succinic, adipic, azelaic, maleic, fumaric, itaconic, phthalic, isophthalic, terephthalic, trimellitic, trimesic and chlorendic (1,4,5,6,7,7-hexachlorobicyclo-[2.2.1] - 5 - heptene-2,3-dicarboxylic acid) acids, and polymerised unsaturated fatty acids such as dimer acids. Anhydrides of suitable polycarboxylic acids can also be used.

Amongst the suitable compounds containing at least two amido groups per molecule, there may be mentioned the diamide derived from dimerised linseed oil acids and having the formula

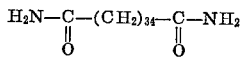

adipamide and the polyamide derived from isophthalic acid and pentamethylene diamine.

Examples of polycarbamates are those derived from organic polyisocyanates and polyols such as the condensation product of tolylene diisocyanate and pentamethylene glycol of formula

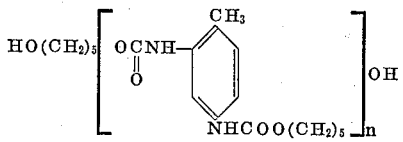

and the condensation product of diphenylmethane-4,4'-diisocyanate and polypropylene glycol of molecular weight 425.

By "epoxidised materials containing at least one epoxide group per molecule" which may be incorporated are meant compounds containing at least one group of the formula

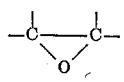

per molecule. Examples of such compounds are epichlorohydrin, styrene oxide, diallyl ether monoxide, cyclohexene oxide, glycidyl phenyl ether, glycidyl stearate, dipentene dioxide, vinyl cyclohexene dioxide, polyallyl glycidyl ether, diphenylolpropanediglycidyl ether, epoxidised polybutadiene, epoxidised styrene-butadiene copolymers, the resinous condensates of epichlorohydrin and aliphatic or aromatic polyols such as glycerol or 2:2-di-p-hydroxy phenyl propane, etc.

Example of polymerisable alpha, beta-monoethylenically unsaturated compounds are 3,4-dihydro-2H-pyran, 2-ethoxy-3,4-dihydro-2H-pyran, 2-alkyl-3,4-dihydro-2H-pyrans, 2-phenyl-3,4-dihydro-2H-pyran, 1-decene, vinyl stearate, lauryl vinyl ether, dibutyl maleate, maleic anhydride, vinyl cyclohexene, alkyl acrylates, alkyl methacrylates, styrene, etc.

Thus the ingredients of the process of the present invention may contain in addition to the ester, catalyst and foaming agent, a proportion of a compound reactive or polymerisable with said ester. The use of different proportions of such materials leads to the formation of foamed materials of widely differing properties. In order to obtain foamed materials of advantageous properties suitable for particular uses it is necessary to vary the proportions of ester and other active ingredients according to the nature of the other active ingredients.

The ingredients of the process may simply be mixed by stirring in a vessel and then quickly poured into a mould and allowed to foam. They may also be mixed in the space which is to be filled with foam if it is suitably shaped. When such stirred mixing is used, it is highly desirable that a surfactant be added to the compositions in order to give foams of small bubbles. However, a surfactant is not always essential. For example, in certain foam-dispensing machines, the ingredients are mixed under pressure using a foaming agent which is gaseous at the mixing temperature, the pressure being controllably released, and the "frothed" mixture is then dispersed to the point of use. In such a "frothing" machine a surfactant is not essential.

Surfactants suitable for use in the foaming compositions of the present invention include surfactants of the types used in the manufacture of foamed cellular polyurethanes, such as silicon surfactants. Particularly suitable surfactants are siloxane oxyalkylene copolymers including those described in U.K. patent specification No. 893,819 and Belgian Patents Nos. 582,362 and 584,089.

The ester of the present invention may be partially or wholly pre-reacted with a compound or compounds reactive or polymerisable with the said ester before addition of the other components, such as foaming agent and catalyst, of the foam manufacturing process.

Foamed cellular polymeric materials made from the esters of the present invention may be used for a variety of purposes, for example flexible foamed materials may be used for upholstery, mattresses, etc. and rigid foamed materials may be used for heat or sound insulating purposes for example for filling refrigerator cabinet walls or for the construction of building panels.

The invention is illustrated but not limited by the following examples.

Example 1.—Preparation of the neopentylglycolester of 3,4-dihydro-2H-pyran-2-carboxylic acid Acrolein tetramer (3,4-dihydro-2H-pyran-2-methyl-(3,4-dihydro-2H-pyran-2-carboxylate) 2,585 parts, 2 mols.) was dried by heating at 100° C. and a pressure of 15 mm. Hg for 1 hour and cooled to room temperature.

Neopentyl glycol (600 parts, 1 mol.) was dried by azeotroping with benzene (300 ml.) the water being separated and the benzene returned to the glycol solution continuously. When no more water could be removed the solution was cooled to room temperature and the suspension of neopentyl glycol in benzene so formed added to the acrolein tetramer.

Benzene was removed by distallation through a 9″ x ¾″ distillation column (insulated) surmounted by a Claisen head and condenser. Some of the glycol sublimed into the distillation column during this process.

An ester interchange catalyst was prepared by dissolving sodium (5.5 parts) in 2-hydroxymethyl-3,4-dihydro-2H-pyran (100 parts by volume) and added to the acrolein tetramer/neopentyl glycol blend at 100° C. The temperature was raised to ca. 150° C. and the pressure reduced to ca. 140 mm. Hg when slow distillation of 2-hydroxymethyl-3,4-dihydro-2H-pyran began.

The pressure was reduced during the reaction to provide a steady distillation rate (finally being 15 mm. Hg), the temperature slowly climbing to ca. 160° C. The last traces of 2-hydroxymethyl-3,4-dihydro-2H-pyran were removed by heating for 4 hours at 10 mm. Hg and 160° C. in the absence of the distillation column. A total of 1288 parts of distillate was collected.

Analysis by nucelar magnetic resonance showed this distillate to contain 23.3 parts neopentyl glycol, 46 parts benzene and 1171 parts 2-hydroxymethyl-3,4-dihydro-2H-pyran. Since 100 parts of alcohol were used in catalyst preparation the net yield of pure by-product 2-hydroxymethyl-3,4-dihydro-2H-pyran was 1071 parts.

The residue (1997 parts) was a mobile brown liquid. Infra-red analysis showed the product to consist principally of the required neopentyl bis-ester of the formula

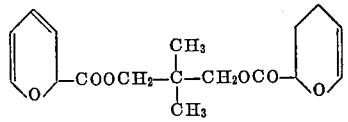

Gas-liquid chromatographic analysis showed the product to contain about 1% of unreacted neopentyl glycol and about 25% of acrolein tetramer.

Example 2

A rigid foam was made from this resin by blending to give a homogeneous solution a mixture of the crude resin of Example 1 (100 parts), 4,4'-dihydroxydiphenyl-2,2-propane (25 parts), a siloxane oxyalkylene copolymer surfactant (1.25 parts) and trichloromonofluoromethane (30 parts) then adding as catalyst 7.5 parts of a solution of 40% aqueous fluoroboric acid diluted to 10% with polyproplyene glycol of molecular weight ca. 400. After rapid blending for 10 seconds the mix was poured into a mould; foaming began 3 minutes and 40 seconds after adding the catalyst and was complete after a further 1 minute 20 seconds. The pale brown foam produced was of fine texture and did not shrink on cooling to atmospheric pressure. It was not scorched and was of good strength in view of its low density (1.7 lb./cu. ft). No significant loss in weight occured on refluxing a ¾" cube of the foam with 250 ml. of water during two days.

What I claim is:

1. The neopentyl-bis-ester of 3,4-dihydro-2H-pyran-2-carboxylic acid, said ester having the formula

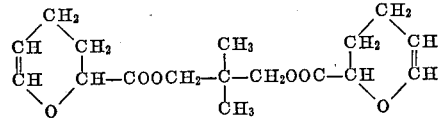

References Cited

UNITED STATES PATENTS 3,206,479  9/1965  Sax _____ 260—345.8

HENRY R. JILES, *Primary Examiner.*

J. M. FORD, *Assistant Examiner.*